United States Patent [19]

Bailey et al.

[11] Patent Number: 5,488,734
[45] Date of Patent: Jan. 30, 1996

[54] COUPLER FOR PROVIDING A HIGH SPEED INTERFACE BETWEEN A COMMUNICATION CONTROLLER AND A CONTROLLER EXTENSION

[75] Inventors: Warren D. Bailey, Pittsboro; Kenenth J. Barker; Joan M. Bellinghausen, both of Cary; George M. Calhoun, Raleigh, all of N.C.; Bernard J. Naudin, Saint Laurent Du Var; Edward Suffern, Vence, both of France

[73] Assignee: International Business Machines Corporation, Armonk, N.Y.

[21] Appl. No.: 333,932

[22] Filed: Nov. 3, 1994

Related U.S. Application Data

[63] Continuation of Ser. No. 909,887, Jul. 7, 1992, abandoned.

[51] Int. Cl.⁶ ................................................. G06F 13/00
[52] U.S. Cl. ..................... 395/800; 395/250; 395/853; 364/228.5; 364/231.4; 364/231.5; 364/231.7; 364/DIG. 1
[58] Field of Search ............................. 395/800, 250, 395/200; 364/DIG. 1, 228.5, 231.4, 231.5, 231.7

[56] References Cited

U.S. PATENT DOCUMENTS

| | | | |
|---|---|---|---|
| 4,126,779 | 11/1978 | Jowers et al. | 235/432 |
| 4,378,588 | 3/1983 | Katzman et al. | 395/275 |
| 4,509,113 | 4/1985 | Heath | 395/275 |
| 4,527,237 | 7/1985 | Frieder et al. | 395/200 |
| 4,562,450 | 12/1985 | Ellis, Jr. et al. | 340/771 |
| 4,593,352 | 6/1986 | Castel et al. | 364/200 |
| 4,651,276 | 3/1987 | Vahlstrom et al. | 364/200 |
| 4,896,262 | 1/1990 | Wayama et al. | 364/200 |
| 5,003,463 | 3/1991 | Coyle et al. | 395/275 |
| 5,003,465 | 3/1991 | Chisholm et al. | 395/275 |
| 5,163,131 | 11/1992 | Row et al. | 395/200 |

FOREIGN PATENT DOCUMENTS

| | | |
|---|---|---|
| 8604169 | 7/1986 | European Pat. Off. . |
| 326696 | 12/1988 | European Pat. Off. . |
| 9110958 | 7/1991 | European Pat. Off. . |

OTHER PUBLICATIONS

Kenneth Mason Publications, Ltd, England, Jul. 1991, No. 327, entitled—"Picoprocessor Mapping of Two Different Operating Systems", J. J. Allen et al.
IBM, TDB, vol. 34, No. 12, May 1992, pp. 151–152.

Primary Examiner—Alyssa H. Bowler
Assistant Examiner—Dzung C. Nguyen
Attorney, Agent, or Firm—Stephen T. Keohane

[57] ABSTRACT

A communications system for transmitting data utilizes one or more picoprocessors located logically out of the main data path for conducting calculations and control functions in a fashion which is decoupled or separate from the main data path. In particular, the system utilizes multiple picoprocessors for performing buffer management and high performance buffer chaining processes out of the main data path so that the main data path may be continually used in parallel. In this manner, data transfer is enhanced by offloading functions and responsibilities from the main system processor and removing unnecessary traffic from the main data path.

5 Claims, 5 Drawing Sheets

5,488,734

COUPLER FOR PROVIDING A HIGH SPEED INTERFACE BETWEEN A COMMUNICATION CONTROLLER AND A CONTROLLER EXTENSION

The application is a continuation, of application Ser. No. 07/909,887, filed Jul. 7, 1992 now abandoned. This application is related to a copending application, entitled "Method and Apparatus for Extending the Connection Capability of a Communication System", filed concurrently herewith.

BACKGROUND OF THE INVENTION

1. Field of the Invention

The present invention relates to data communications and, more particularly, to a system for facilitating the transfer of data by using a picoprocessor located logically out of the main data path for conducting calculations and control functions in a fashion which is decoupled or separate from the main data path.

2. Prior Art

Communications system are becoming faster and faster as the communication equipment, as well as the actual physical medium over which data is transmitted, improves. The communication equipment is becoming "smarter", each piece of equipment having its own microprocessors for controlling the activity of the equipment.

For example, microprocessors are utilized to perform a variety of functions within communication equipment. A microprocessor is especially valuable due to the flexibility it allows and the speed at which it operates. A change to software which runs the equipment allows the equipment performance to be modified without modifying the hardware. The speed at which a microprocessor transfers data is also relatively fast.

There is a problem, however, when the microprocessor in the communication equipment becomes the bottle-neck of the data transfer. This can occur because of a number of reasons, such as when the microprocessor is responsible for too many tasks, when there has been a sudden surge of activity, or when the speed at which the data needs to be transferred is faster than the microprocessor can provide.

SUMMARY OF THE INVENTION

A communication system for transmitting data utilizes one or more picoprocessors located logically out of the main data path for conducting calculations and control functions in a fashion which is decoupled or separate from the main data path. In particular, the system utilizes multiple picoprocessors for performing buffer management and high performance buffer chaining processes out of the main data path so that the main data path may be continually used in parallel. In this manner, data transfer is enhanced by off-loading functions and responsibilities from the main system processor and removing unnecessary traffic from the main data path.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

DETAILED DESCRIPTION OF THE PREFERRED EMBODIMENT

In the preferred embodiment, the communications system of the present invention operates with a communication controller, such as the IBM 3745 communication controller, and a controller extension for allowing additional communication lines to communicate with the controller. As an example, a communication controller may utilize a plurality of communication adapters for providing access for a host to the various types of telecommunication lines. The communication adapters act as an interface between the telecommunication lines and the controller.

Figure 1:
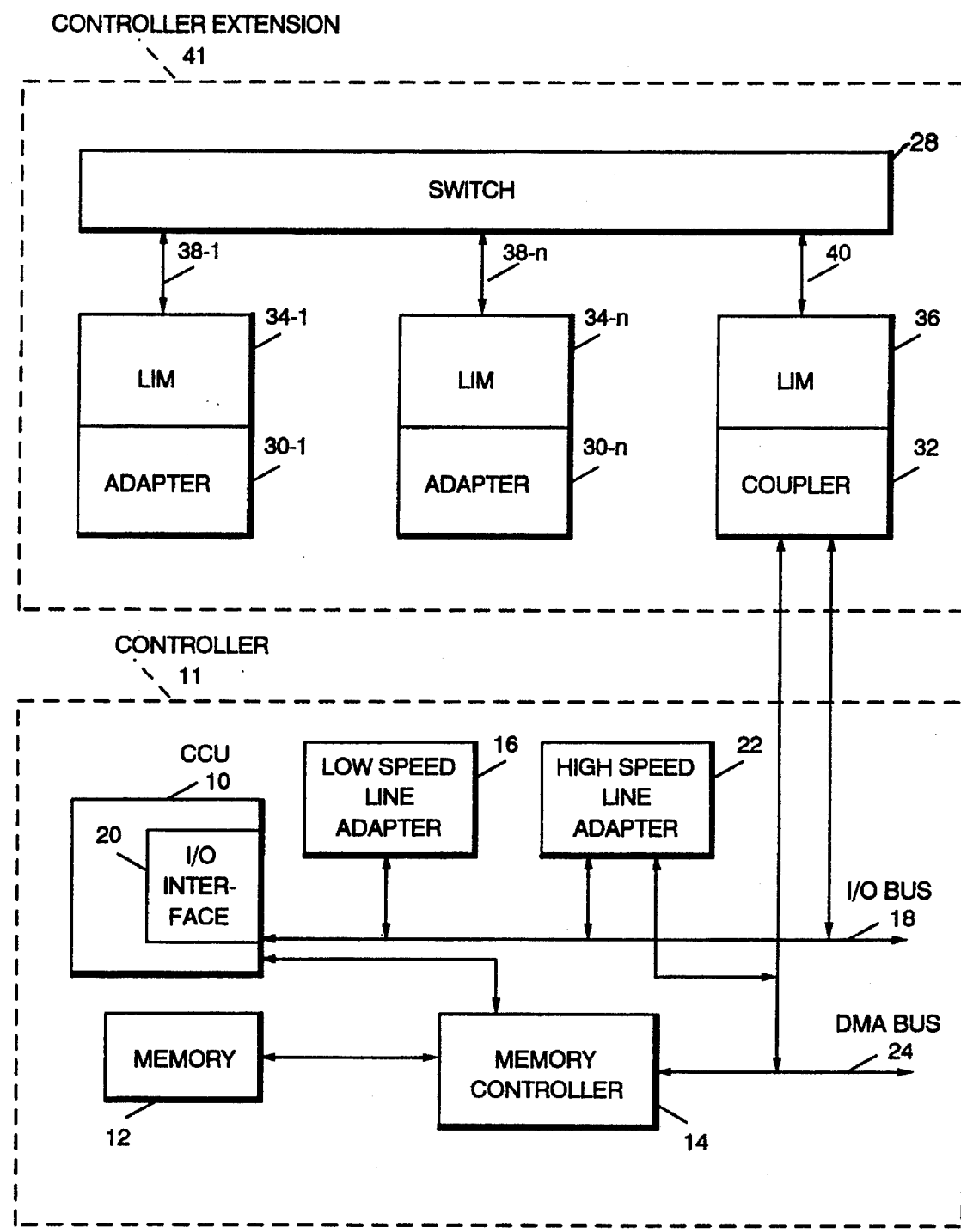
FIG. 1 is a block diagram illustrating a communication system utilizing the method and apparatus of the present invention.

As shown in FIG. 1, a communication controller 11 comprises a central control unit (CCU) 10 which runs a Network Control Program (NCP) stored in a memory 12. Access to memory 12 is managed by a memory controller 14.

As discussed above, communication controller 11 utilizes a plurality of communication adapters for providing access to the telecommunication lines. In this case, as an example, low speed adapter 16, which provides access to low speed telecommunication lines, is utilized and is connected to CCU 10 through an input/output (I/O) bus 18. An I/O interface 20 manages the exchange of information between the adapter and CCU 10 on I/O bus 18. U.S. Pat. No. 4,593,352 describes in greater detail the system and method for exchanging information and data on the I/O bus.

In addition, a high speed line adapter 22 is utilized and is connected to CCU 10 through I/O bus 18. Because of the high speed in which data is transmitted over the high speed lines, high speed line adapter 22 has direct memory access (DMA) to the memory through a DMA bus 24 connected to the memory controller 14.

One of the functions of the NCP is to receive and transmit the messages which comprise either control messages or data messages called physical information units (PIUs) from/to end users attached to the adapters and CPUs. This is accomplished by enqueuing and dequeuing these messages to/from buffer chains built into the memory 12 under control of the NCP.

As described in U.S. Pat. No. 4,593,352, at initialization the NCP builds a line vector table (LNVT) which comprises a memory location assigned to each communication line corresponding to line adapters 16, 22. The assigned memory location stores the address of a parameter/status area (PSA) reserved in memory 12 for storing parameter and status information corresponding to the transmit and receive directions of the corresponding communication line.

The PSAs are used for command and status transfers between the CCU and the microprocessors in the line adapters for controlling the message exchanges as fully described in U.S. Pat. No. 4,593,352.

In accordance with the preferred embodiment of the present invention, a controller extension 41 implementing the present invention may be utilized to extend the telecommunication line capability of controller 11. Controller extension 41 is connected to controller 11 via I/O bus 18 and DMA bus 24 and comprises a plurality of communication adapters 30-1 to 30-n for providing the controller with additional communication capability. A coupler 32 acts as an interface between the controller extension 41 and the controller 11 so that messages may be exchanged between the memory 12 and the adapters 30-1 to 30-n.

Within the controller extension 41, the adapters 30-1, 30-n are able to each communicate with the coupler through an interconnection mechanism, or switch 28. A specific mechanism able to perform this interconnection is described in EP-A-0 000387464.

Line interface modules (LIMs) 34-1 to 34-n provide an interface between the adapters 30-1 to 30-n and the switch 28. Similarly, LIM 36 acts as an interface between the coupler 32 and the switch 28. The primary function of each LIM 34-1 to 34-n is to receive messages from its corresponding adapter 30-1 to 30-n, enqueue the messages in output queues for transmission to the coupler 32, and to receive messages switched by switch 28 so that the messages can be transmitted by the communication adapters to the users connected thereto. A mechanism for performing these functions is described in EP-A-0 000365761.

As will be discussed below, NCP organizes commands and data into a series of NCP-Parameter Status Areas (NPSAs) or LIM-Parameter Status Areas (LPSAs) chained to NCP-Dynamic Parameter Status Areas (NDPSAs) or LIM-Dynamic Parameter Status Areas (LDPSAs) chained to PIUs. The coupler interfaces to the NCP structure by accessing the NCP memory, concatenating and building the messages for the target LIM in the transmit direction and by arranging the messages from the LIMs in the NCP memory in the receive direction.

The messages to be transmitted from NCP to the LIMs are chained in NCP memory 12 to the NPSA. They are read by the coupler from this memory and transferred to the LIMs by LIM 36 and switch 28.

Figure 2:
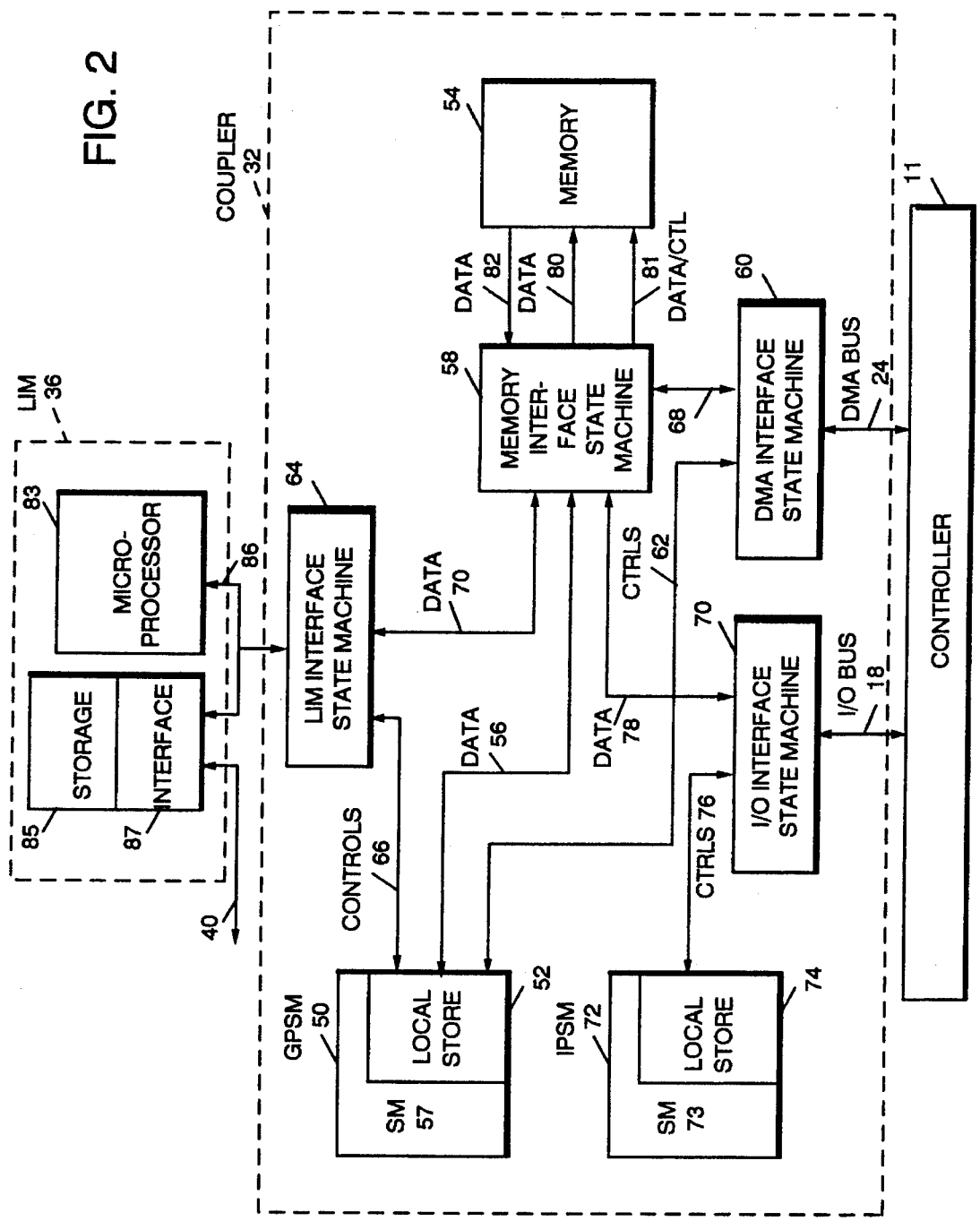
FIG. 2 is a block diagram of a controller extension utilized in the communication system using the present invention.

Referring now to FIG. 2, coupler 32 and corresponding LIM 36 are shown in greater detail. As will be discussed, the coupler 36 utilizes picoprocessors, out of the main data path, for performing the hardware chaining and unchaining of commands and for formatting the messages exchanged between the adapters and the controller memory 12. The picoprocessors are capable of multiplexing up to 1024 lines at once.

As mentioned above, the coupler controls the data flow between the controller 11 and the controller extension 41 over I/O bus 18 and DMA bus 24. Once the data flow has been established, the picoprocessors are free to perform all buffer chaining/unchaining calculations and to format the messages to be exchanged.

In order to interface with the I/O bus 18 and the DMA bus 24, the coupler 32 includes an I/O interface state machine 70 and a DMA interface state machine 60. Similarly, LIM interface 64 is utilized for interfacing with the LIM 36.

In addition, coupler 32 utilizes a general picocoded state machine (GPSM) 50, an input/output picocoded state machine (IPSM) 72, a memory 54, and a memory interface state machine 58 for interfacing the memory 54 with the other coupler components. GPSM 50 and IPSM 72 are also commonly referred to as picoprocessors.

GPSM 50, which controls the DMA interface state machine 60 over control bus 62 and also controls the LIM interface state machine 64 over control bus 66, consists of a state machine (SM) 51 and a local store 52. SM 51 has logic circuitry and associated registers and counters. Local store 52, which provides the GPSM 50 with an interface with memory 54 via data bus 56 and memory interface state machine 58, comprises a small amount of random access memory (RAM) for use as a scratch pad by SM 51. For example, parameters may be moved into local store 52 from the memory 54 for being used to create the commands on control bus 62 and control bus 66. Also, status information from the DMA interface state machine 60 and the LIM interface 64 can be placed in local store 52 for analysis by SM 51.

DMA interface state machine 60 is interconnected to memory 54 by data bus 68 through memory interface state machine 58. Similarly, LIM interface state machine 64 is connected to memory 54 via data bus 70 through memory interface state machine 58. In response to commands issued by the GPSM 50 over control bus 66 to LIM interface 64 and over control bus 62 to DMA interface state machine 60, data is transferred between LIM interface 64 and memory interface state machine 58 over data bus 70 and, likewise, between DMA interface state machine 60 and memory interface state machine 58 via data bus 68.

Similar to the GPSM 50, the IPSM 72 comprises a state machine (SM) 73, comprising logic circuitry, counters and registers, and a local store 74 for interfacing with memory 54. As with the GPSM local store 52, IPSM local store 74 comprises a small amount of RAM for use as a scratch pad by SM 73 so that data may be moved thereto for being processed. The IPSM 72 communicates with the I/O interface 20 in the CCU 10 (FIG. 1) over the I/O bus 18 and internal control bus 76. In response to commands issued by the IPSM 72 over control bus 76, data may be exchanged between the I/O interface state machine 70, the local store 74 and the memory interface state machine 58. In this manner, the command and interrupt mechanisms between NCP and the LIMs are maintained.

The DMA interface state machine 60 comprises logic circuitry for maintaining the interface with the controller DMA bus 24 and is dependent upon the GPSM 50 to initialize the control parameters required for data transfers between the controller memory 12 and the coupler memory 54.

The I/O interface state machine 70 is logic circuitry that maintains the interface to the controller I/O bus 18 and provides the IPSM 72 with I/O instructions issued by the NCP. Also, data to be transferred to the controller via the I/O bus 18 is provided across I/O interface state machine 70.

The LIM interface 64 comprises logic circuitry for maintaining the interface to the LIM 36. The GPSM 50 is utilized to initialize the control parameters required to perform transfers. Destination and source address, data count, read or write commands are provided by the GPSM 50. Control fields are built in the memory 54 by the GPSM before issuing a start command for the LIM interface 64. The GPSM 50 polls for completion of transfer and then collects status in local store 52 to determine the success of the transfer.

The memory is used to hold user data, configuration tables about the controller extension 41, address tables for the possible ports of the controller extension 41. Memory incoming data are provided on data bus 80 from local stores 52, or 74, DMA interface state machine 60 or LIM interface 64. Memory outgoing data on data bus 82 are provided to local stores 52 or 74, DMA interface state machine 60 or LIM interface 64. Address and control for memory 54 are provided on bus 81.

Memory interface state machine 58 maintains, arbitrates and controls traffic in and out of memory 54 from all its possible sources and destinations. This arbitration can be done through any conventional handshake interface between all users and the memory interface state machine 58.

The LIM interface module 36 comprises a microprocessor 83 running control code stored in storage 85 and attached to the LIM interface 64 through bus 86.

Data store interface 87 controls the chaining and enqueuing in storage 85 of the messages or PIUs coming from buses 40 and 86 and the unchaining and dequeuing from storage 85 of the messages or PIUs to be sent on buses 40 and 86 in order to control the transmit traffic from NCP to LIMs and the receive traffic from the LIMs to NCP.

Figure 3:
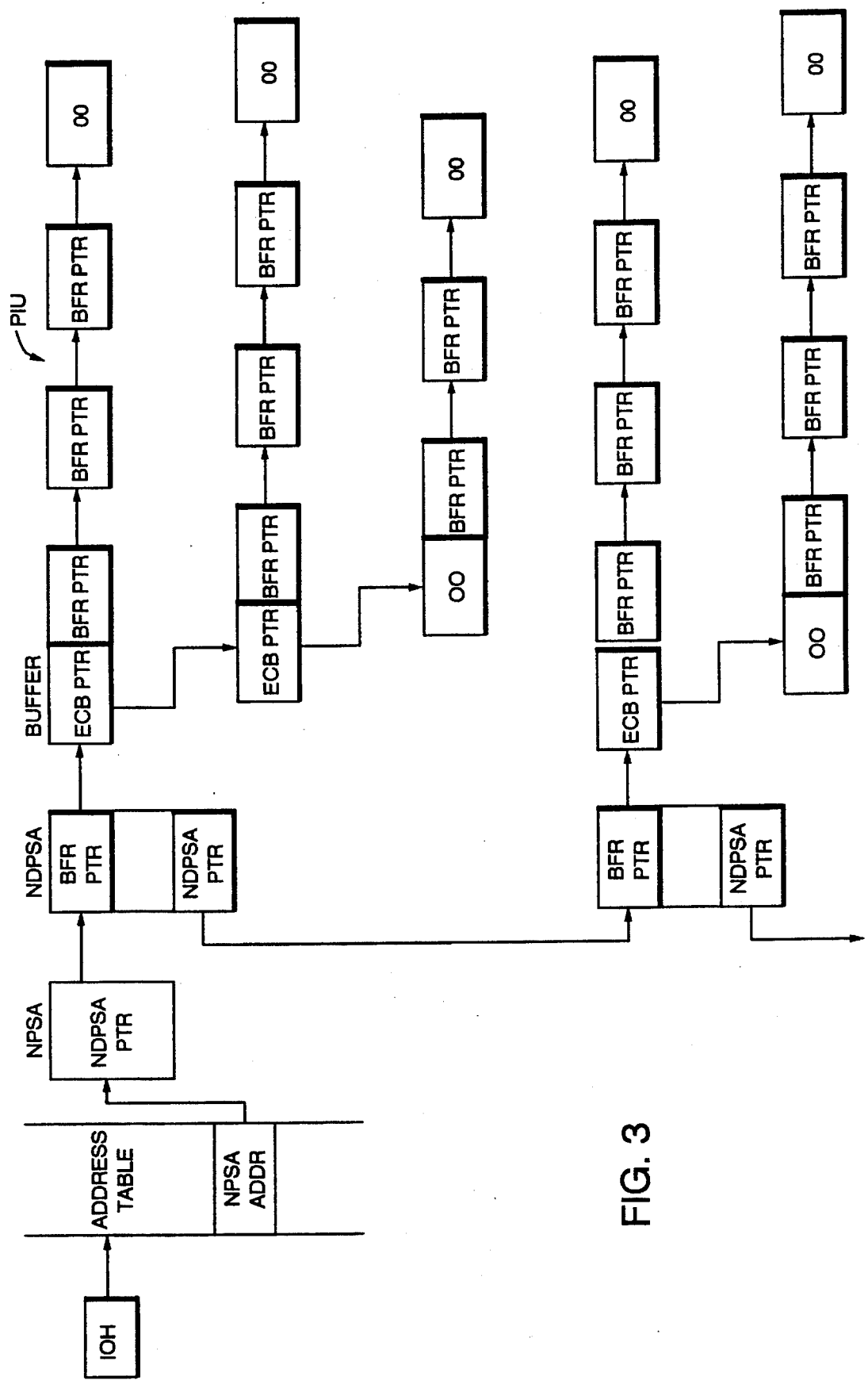
FIG. 3 illustrates the buffer chaining in the network control program.

For NCP to communicate with a target LIM, it must build a series of entities in the communication controller memory 12. The chaining of these entities is shown in FIG. 3. First, an NPSA controls the target communication line and is the mechanism to exchange the line status after each series of commands are issued by NCP. Second, this NPSA points to an NCP-Dynamic Parameter Status Area (NDPSA) which contains line messages and points to data. The third entity is a PIU which contains the actual data for the target LIM. The PIU (PIU 1) may be chained to another PIU (PIU 2) by an extended control block ECB which points to the first buffer of PIU 2. In the other direction, for the LIM to communicate with NCP, NCP reserves similar areas in memory 12, namely a chain of PIU buffers, a series of LIM-Dynamic Parameter Status Areas (LDPSAs) and a LIM Parameter Status Area (LPSA).

The handling of NPSA, LPSA, NDPSA, LDPSA, and data is done through the coupler 32. Once it receives an input/output command IOH (FIG. 3) from bus 18, it accesses the NPSA, NDPSA and PIU and forms a message that can be handled by the target LIM. In the reverse direction, the coupler receives a message from a target LIM and formats it into the correct sequence understood by NCP.

Prior to the implementation of the present invention, chaining and dechaining of buffers was accomplished by the NCP and microprocessors utilizing an application program. The application programs are slow and inefficient in meeting the high throughput requirements of data transfer between main memory and line adapters. Hardware chaining techniques meet performance, but have limited capability of chaining only data buffers for a single line using a fixed buffer size.

By implementing the present invention, the high throughput requirements of data transfer between main memory and line adapters is met. In addition, the use of the picoprocessors decoupled from the main data path, in this case the DMA bus, provide the flexibility necessary so that the size of the data buffers can vary depending upon need.

Another problem encountered prior to the implementation of the present invention was buffer management and data transfer. The transfer of data from memory to an adapter via direct memory access (DMA) was done serially using a DMA controller. This method is very inefficient as the DMA bus remains idle while logic is calculating the new data buffer address and re-initializing the DMA controller.

However, the utilization of a picoprocessor using a logic path for calculations decoupled from the main data movement data path is able to perform buffer management look-ahead eliminating the serial management of buffers and increasing the throughput on the DMA bus.

As discussed above, the coupler 32 interfaces to the NCP structure by accessing the main memory 12 over DMA bus 24, and concatenating and building messages for the target LIM's microprocessor. The target LIM may be any of the installed LIMs 34-1, 34-n for the various communication adapters 30-1, 30-n in controller extension 41. For controller (11)-to-LIM traffic, NCP provides a series of chained PIU buffers for multiple communication lines (as illustrated in FIG. 3). The coupler 32 must dechain and interpret these buffers as it DMAs data from the memory 12 and forms a message for the corresponding LIM 34-1, 34-n. The coupler 32 performs these tasks logically decoupled from the NCP and the DMA bus so that other activities may be performed in parallel.

In the other direction (LIM-to-controller (11) traffic), NCP provides a series of chained, empty buffers. As coupler 32 receives messages from the active LIM 34-1, 34-n, coupler 32 must chain the messages together correctly in the controller memory 12. Again, the tasks are accomplished out of the main data path.

Figure 4:
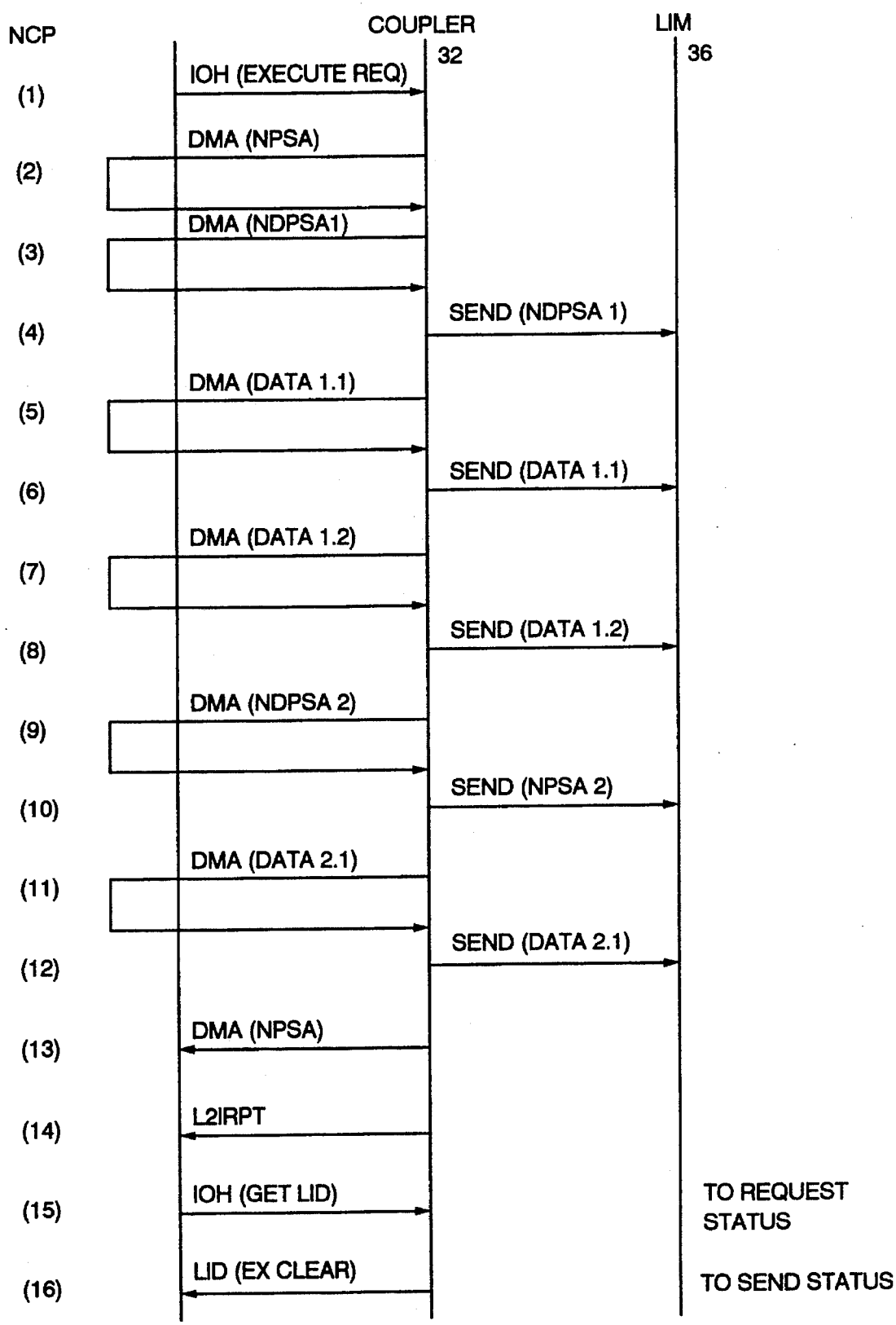
FIG. 4 illustrates the messages exchanged between the coupler, the NCP and the LIM.
Figure 5:
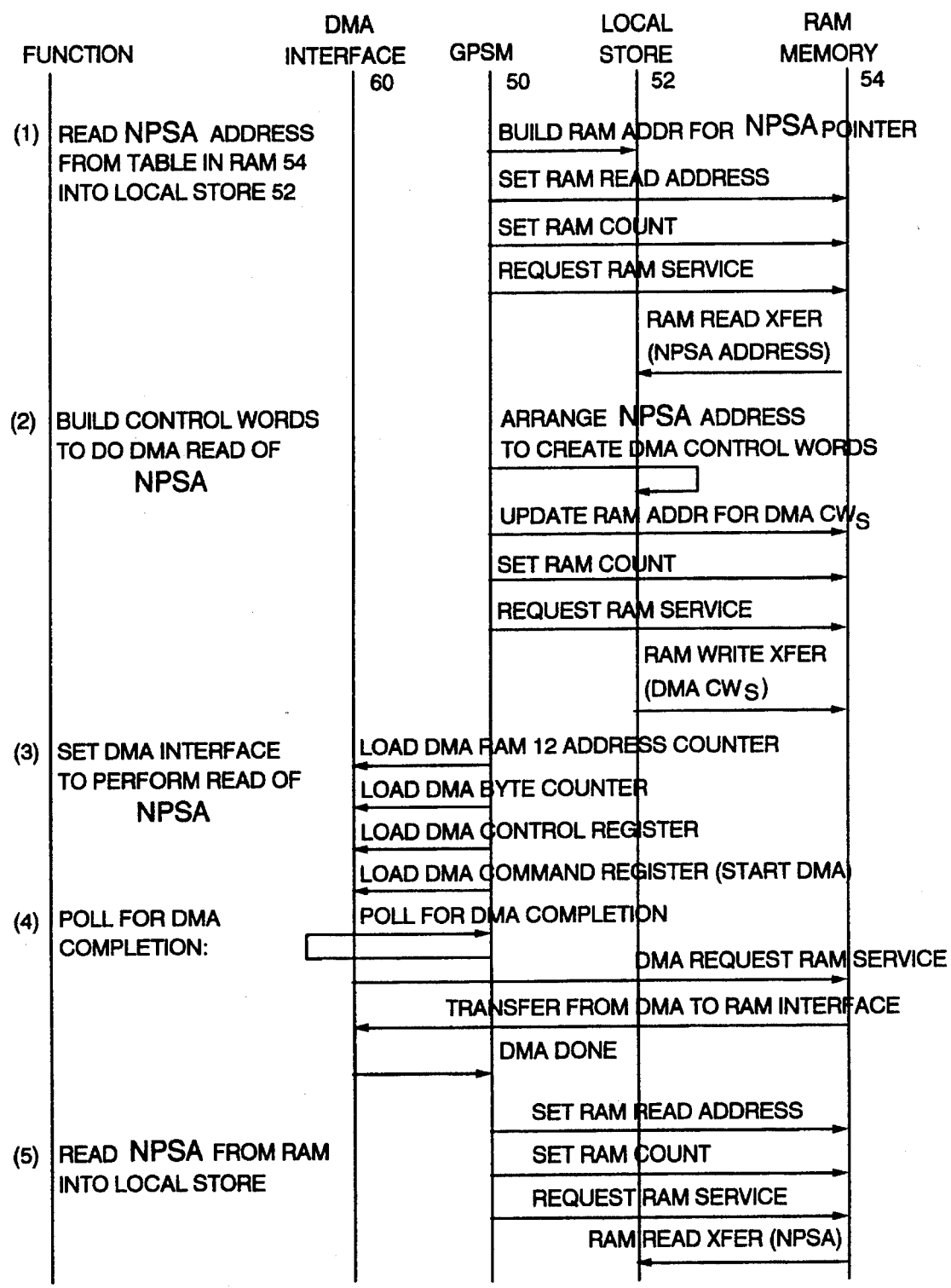
FIG. 5 illustrates an example the operations performed, out of the main data path, by the picoprocessor of the present invention.

FIG. 4 shows the message exchange between the NCP, coupler 32 and LIM 36 where data is being transmitted from the NCP to a particular communication adapter. FIG. 5 illustrates a portion of the picoprocessor (GPSM 50) involvement in NCP to LIM flow for fetching NPSAs, NDPSAs and PIUs.

As shown in FIG. 4, (1) the NCP issues a broadcast input/output operation (IOH command) with a EXECUTE REQ code operation requesting data transfer to a particular LIM. The IOH command is transmitted over the I/O bus 18 and is received by the I/O interface state machine 70. The IPSM 72 receives the command, checks it for parity, address validity, etc., and stores it in memory 54 in an address look-up table, established by NCP at Initial Program Load (IPL), so that it may be processed later. The address table (FIG. 3) may stack up to 1024 commands for future processing. (In the past, each command needed to be processed immediately and would, in many cases, delay the operation of the NCP.)

The coupler 32, via another one of its picoprocessors (GPSM 50), obtains the address of the NPSA in the address look-up table. It then DMAs the NPSA into its local store 52 (2) to obtain the address of the first of multiple NDPSAs to be processed. The coupler 32 then DMAs the NDPSA (3) and sends it to the corresponding LIM (4). The data to be transferred to the LIM is DMAed by the coupler and sent to the LIM (5–12). After all of the data is transmitted to the LIM, the coupler gives the NCP status of the transfer and the transfer is complete (13–16). Although many operations are performed on the data from the NCP by the coupler prior to transmission to the LIM, i.e., dechaining of NDPSAs and PIUs, etc., the DMA bus is free for other uses as these operations are performed in parallel.

The GPSM 50 activity during a direct memory access is shown in FIG. 5. In this case, as an example, an NPSA is being DMAed from NCP for processing by the coupler. The GPSM process for a transmit command is generally broken down into five functions: (1) read NPSA address from table in RAM 54 into local store 52; (2) build control words to do DMA read of NPSA; (3) setup DMA interface to perform read of NPSA; (4) poll for DMA completion; and (5) read NPSA from RAM 54 into local store 52. The actual messages exchanged between the DMA interface 60, the GPSM 50, the local store 52 and the RAM memory 54 is shown with the arrows indicating an exchange of data or control words.

In order to read the NPSA address from RAM 54 into local store 52, the GPSM 50 configures its local store 52 for receipt of the address, requests the address from RAM 54 and receives the address into its local store.

Next, the GPSM 50 must build control words (CWs) so that the proper NPSA address format is used during the DMA. This includes rearranging the NPSA address in local store 52 and requiring the NPSA address back into RAM 54.

During the DMA interface 60 setup, the GPSM 50 loads the DMA interface 60 control and command registers and address and byte counters so that the DMA interface 60 may perform the read of the NPSA.

The GPSM 50 keeps a status of the DMA by polling for its completion.

After the DMA of the NPSA is complete, the GPSM 50 reads the NPSA into its local store 52 so that it can be processed, i.e., the NDPSA address can be obtained and it (the NDPSA) can be DMAed, by the same process, next. It is in this way the buffers are dechained, out of the main data path, by the picoprocessor, GPSM 50, thereby enhancing the data flow through the communication system.

In data transfer the receive direction, the coupler 32 is allocated, in memory 54, a number of free (empty) buffers for each line. As a message is received from the target LIM, the GPSM 50, in a similar manner as discussed above, breaks it down into the NCP buffer sizes, DMAs it buffer-by-buffer and chains it together in NCP storage. When the series of messages has been transferred, the picoprocessor adds the beginning and ending buffer addresses to the LDPSA. The LDPSA is then stored in memory and the LDPSA updated. The messages are stored in memory until the target LIM sends the "last message" to be transferred to NCP. The GPSM stores the PIU, updates and stores the LDPSA and the LPSA. The IPSM then informs the NCP that the entire message is ready for processing by an interrupt over the I/O bus.

The program to perform these functions is loaded in memory 54. By utilizing picoprocessors controlled by picocode, the system has the flexibility to process chains of messages (NPSA, NDPSA, PIU) as compared to only data buffers (PIUs) of hardware chaining techniques and to process varying buffer sizes for each line not accomplishable by hardware designs. In addition, the picoprocessors perform these operations with great performance not available from an external microprocessor.

While the invention has been particularly shown and described with reference to preferred embodiments thereof, it will be understood by those skilled in the art that various other changes in form and detail may be made without departing from the spirit and scope of the invention.

What is claimed is:

1. A coupler, for use in a communication system having a communication controller and a controller extension, for transferring individual segments of data at a high speed between the communication controller and the controller extension, the coupler for being connected to the communication controller by a first bus and a second bus and to the controller extension by a third bus, the coupler comprising:

a.) a memory for temporarily storing commands and data segments received from the first bus, the second bus and the third bus;

b.) means, connected between the second bus and the memory (element a) for retrieving and temporarily storing commands from the second bus and sending commands to the second bus;

c.) a first picoprocessor connected to the memory (element a) and to the second bus retrieving and sending means (element b) for retrieving from the second bus retrieving and sending means (element b) commands received from the second bus and placing the received commands in a queue in the memory (element a);

d.) means, connected between the first bus and the memory (element a), for retrieving data segments from the first bus and sending the data segments to the memory and for retrieving data segments from the memory and sending the data segments to the first bus;

e.) means, connected between the third bus and the memory (element a) for retrieving data segments from the third bus and sending the data segments to the memory and for retrieving data segments from the memory and sending the data segments to the third bus;

f.) the memory (element a), the first bus retrieving and sending means (element d), and the third bus retrieving and sending means (element e) comprising a main data path over which the data segments pass between the first bus and the third bus; and g.) a second picoprocessor, located logically out of the main data path, connected to the memory (element a), the first bus retrieving and sending means (element d), and the third bus retrieving and sending means (element e), for managing and controlling the flow of the data segments over the main data path in response to the queued received commands from the second bus.

2. The coupler defined in claim 1 wherein the second bus is an input/output (I/O) bus and the second bus command retrieving and storing means (element b) comprises an I/O interface, the I/O interface being connected to the I/O bus.

3. The coupler defined in claim 1 wherein the first bus is a direct memory access (DMA) bus and the first bus data segments retrieving means (element c) comprises a DMA interface connected to the DMA bus.

4. The coupler defined in claim 1 wherein the controller extension comprises at least one line interface module (LIM) and the third bus is a LIM bus and the third bus data segments retrieving means (element e) comprises a LIM interface connected to the LIM bus.

5. The coupler defined in claim 1 wherein the second picoprocessor (element g) manages and controls the flow of the data segments by chaining and dechaining buffered data retrieved from the first bus or the third bus.

* * * * *